(12) United States Patent
Thorn et al.

(10) Patent No.: US 7,347,334 B2
(45) Date of Patent: Mar. 25, 2008

(54) TAPE LIBRARY STORAGE SYSTEM HAVING A SWITCHING RACK MECHANISM

(75) Inventors: Jeffrey L. Thorn, Tucson, AZ (US); Raymond Yardy, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 69 days.

(21) Appl. No.: 11/301,691

(22) Filed: Dec. 12, 2005

(65) Prior Publication Data

US 2007/0131630 A1 Jun. 14, 2007

(51) Int. Cl.
*A47G 19/08* (2006.01)
(52) U.S. Cl. .................................. 211/41.12
(58) Field of Classification Search ............. 211/26, 211/1.51, 41.12, 40, 162, 163; 312/223.1, 312/265.1, 265.4
See application file for complete search history.

(56) References Cited

U.S. PATENT DOCUMENTS

| | | | |
|---|---|---|---|
| 3,769,850 A | 11/1973 | Culligan | |
| 5,718,339 A * | 2/1998 | Woodruff | 211/41.12 |
| 5,999,356 A | 12/1999 | Dimitri et al. | |
| 6,130,800 A * | 10/2000 | Ostwald | 360/92 |
| 6,155,766 A | 12/2000 | Ostwald et al. | |
| 6,496,325 B1 | 12/2002 | Kersey et al. | |
| 6,560,061 B2 * | 5/2003 | Helmick et al. | 360/92 |
| 6,675,063 B2 * | 1/2004 | Bosley et al. | 700/218 |
| 6,839,198 B2 | 1/2005 | Shimanuki | |
| 6,885,515 B2 * | 4/2005 | Steinhilber | 360/69 |
| 7,180,702 B2 * | 2/2007 | Ellis et al. | 360/92 |
| 2003/0123184 A1 | 7/2003 | Ostwald et al. | |
| 2004/0196587 A1 | 10/2004 | Gupta et al. | |
| 2005/0057847 A1 | 3/2005 | Armagost et al. | |

* cited by examiner

*Primary Examiner*—Brian E. Glessner
*Assistant Examiner*—Candace L. Bradford
(74) *Attorney, Agent, or Firm*—Dillon & Yudell LLP

(57) ABSTRACT

An apparatus for transporting a storage media cartridge within a data storage library is disclosed. The apparatus includes a first pair of rack and guide rail, a second pair of rack and guide rail, and an accessor capable of moving on the first pair of rack and guide rail or the second pair of rack and guide rail. The first pair of rack and guide rail is located orthogonally from the second pair of rack and guide rail. Located at an intersection between the first pair of rack and guide rail and the second pair of rack and guide rail, a turn plate may change a moving direction of the accessor. The turn plate includes two racks and four guide rails with a conical shaped rack tooth located at an intersection of the two racks.

7 Claims, 7 Drawing Sheets

TAPE LIBRARY STORAGE SYSTEM HAVING A SWITCHING RACK MECHANISM

BACKGROUND OF THE INVENTION

1. Technical Field

The present invention relates to data storage libraries in general, and in particular to a data storage library having a robotic assembly operating on a guide rail. Still more particularly, the present invention relates to a tape library storage system having a switching rack mechanism.

2. Description of Related Art

An automated data storage library typically uses a mechanical robot to pick and place data storage cartridges into media drives and empty cartridge slots. The mechanical robot is often a self-supporting mechanism having a picker assembly at the end of an arm that can be moved in two or more directions. The robotic movement is commonly controlled by some type of actuator, and the number of actuators is often equal to, but not limited by the number of directions the mechanical robot moves. By using the electronic encoders on the actuators, the picker assembly can be positioned in proximity to the media drives or cartridge slots.

Some attempts have been made to alleviate the constraints of stand alone robotic arms by implementing carousel structures, draw cable devices, and track/rail type systems. These systems have some sort of guide rail (or track) and a carriage that moves the storage media cartridges to and from the media drives. The guide rail forms a path for directing the carriage to any desired position, be it in a continuous loop of a carousel, a straight line, or other combinations of straight and curved sections.

The present disclosure provides an automated tape library storage system having a switching rack mechanism for altering the moving direction of a mechanical robot.

SUMMARY OF THE INVENTION

In accordance with a preferred embodiment of the present invention, an apparatus for transporting a storage media cartridge within a data storage library includes a first pair of rack and guide rail, a second pair of rack and guide rail, and an accessor capable of moving on the first pair of rack and guide rail or the second pair of rack and guide rail. The first pair of rack and guide rail is located orthogonally from the second pair of rack and guide rail. Located at an intersection between the first pair of rack and guide rail and the second pair of rack and guide rail, a turn plate may change a moving direction of the accessor. The turn plate includes two racks and four guide rails with a conical shaped rack tooth located at an intersection of the two racks.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
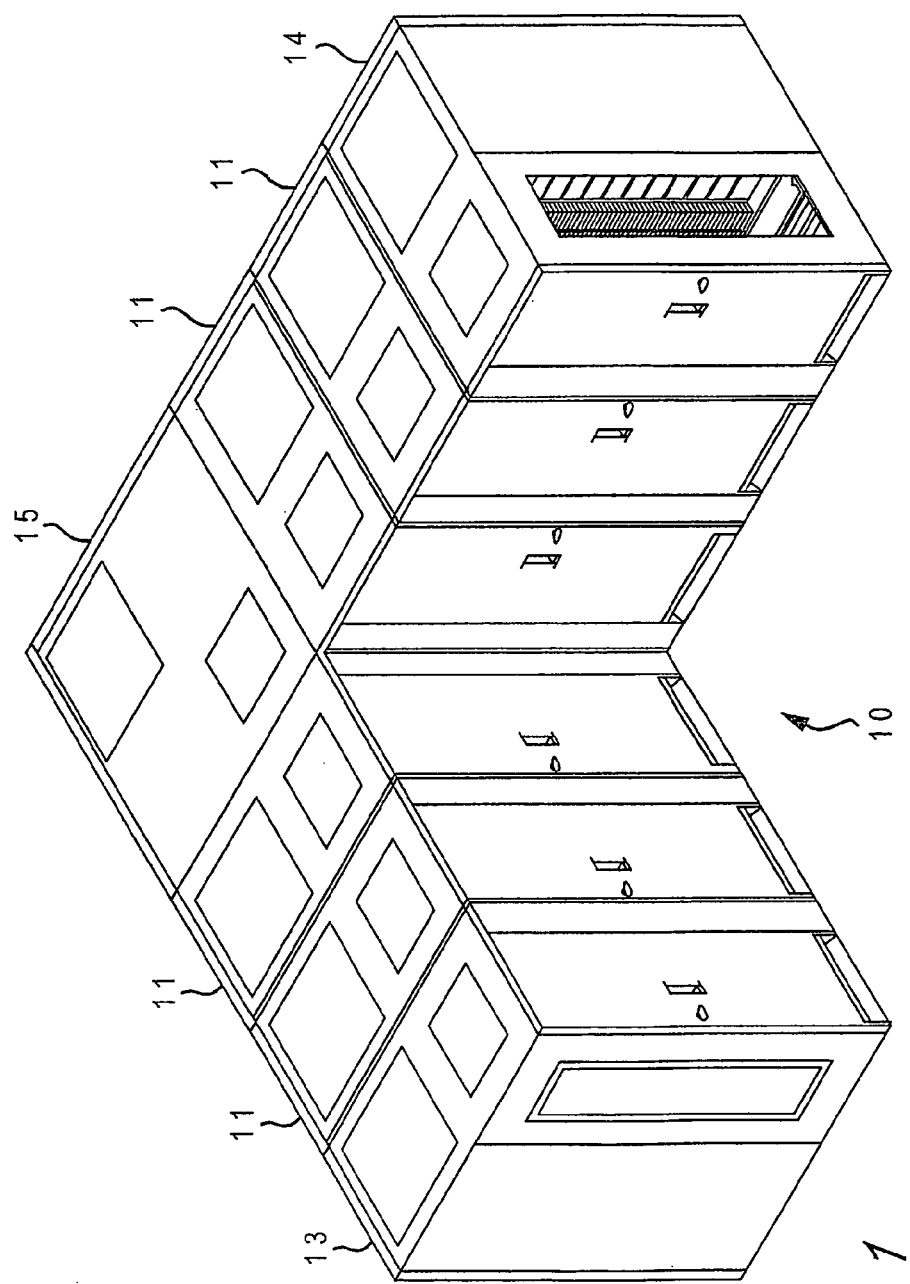
FIG. 1 is an isometric view of an automated data storage library in which a preferred embodiment of the present invention can be implemented.

Referring now to the drawings, and specifically to FIG. 1, there is depicted an isometric view of an automated data storage library in which a preferred embodiment of the present invention can be implemented. As shown, an automated data storage library 10 has a left-side service bay 13, a right-side service bay 14 and multiple storage frames 11, including a corner storage frame 15. A storage frame may be added to expand or removed to reduce the number of storage frames 11 and/or functionality of automated data storage library 10. One example of automated data storage library 10 is the IBM 3584 Ultra-Scalable Tape Library manufactured by International Business Machines Corporation of Armonk, N.Y.

Figure 2:
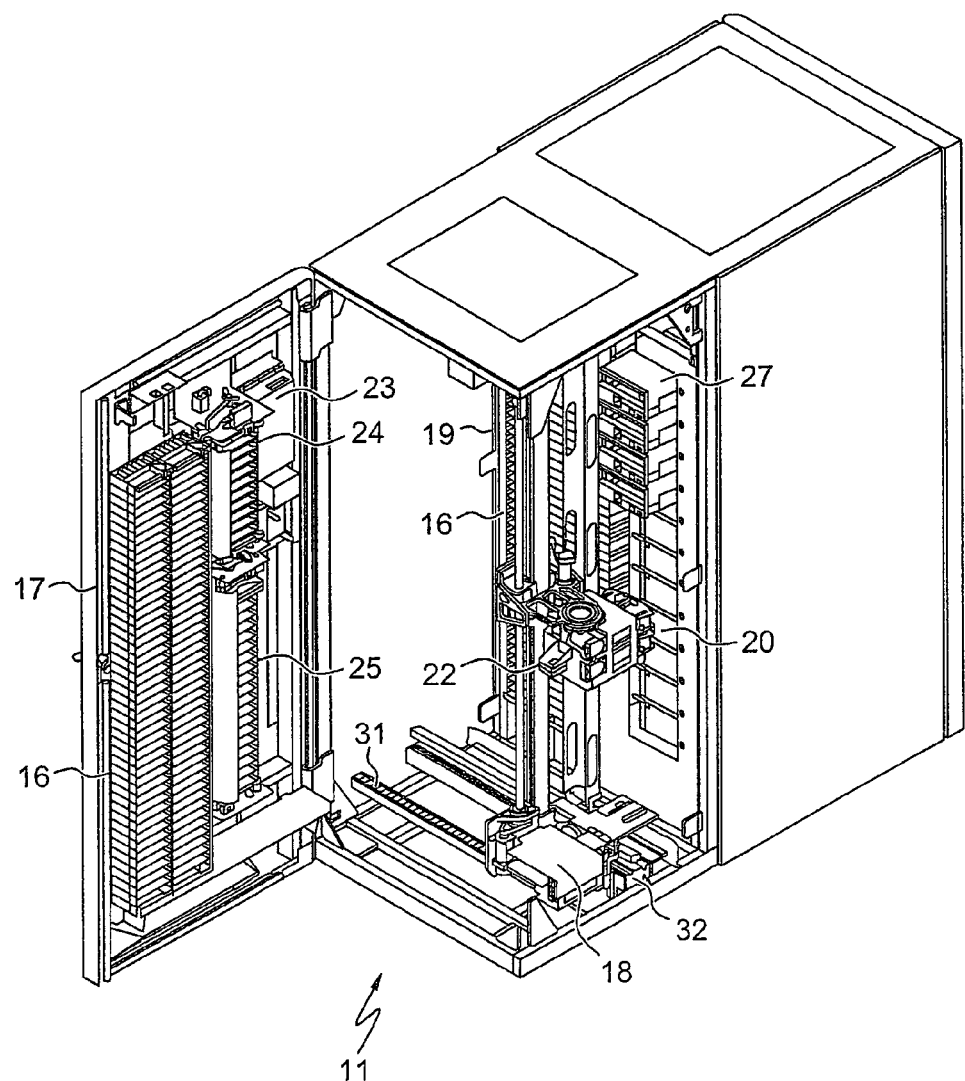
FIG. 2 is an isometric view of the configuration of the internal components of a storage frame within the automated data storage library from FIG. 1, in accordance with a preferred embodiment of the present invention.

With reference now to FIG. 2, there is illustrated an isometric view of the configuration of the internal components of a storage frame within automated data storage library 10, in accordance with a preferred embodiment of the present invention. As shown, storage frame 11 includes a front wall 17, a rear wall 19 and multiple storage cells 16 for storing data storage cartridges that contain data storage media. Storage frame 11 also includes multiple data drives 27 for reading data from and/or writing data to data storage media. An accessor (or robot) 18 is used to transport data storage media between storage cells 16 and data drives 27. Data drives 27 may be optical disk drives, magnetic tape drives, or any other types of drives that is capable of reading from and writing data to data storage media. Accessor 18 includes a gripper assembly 20 for gripping data storage media and may include a bar code scanner 22 mounted on gripper assembly 20 to "read" identifying information associated with the data storage media.

Storage frame 11 is arranged for accessing data storage media in response to commands from at least one external host computer system (not shown). Storage frame 11 may optionally include an operator panel 23 (or other user interface) that allows a user to interact with storage frame 11. Storage frame 11 may also optionally include an upper input/output (I/O) station 24 and/or a lower I/O station 25 for allowing data storage media to be inserted into storage frame 11 and/or removed from storage frame 11 without disrupting library operations.

Storage frame 11 may be configured with different components depending upon the intended function. The configuration of storage frame 11 shown in FIG. 2 has a rack 31 and a guide rail 32. However, other storage frames, such as corner storage frame 15 from FIG. 1, also includes a switching rack mechanism for changing the moving direction of accessor 18.

Figure 3:
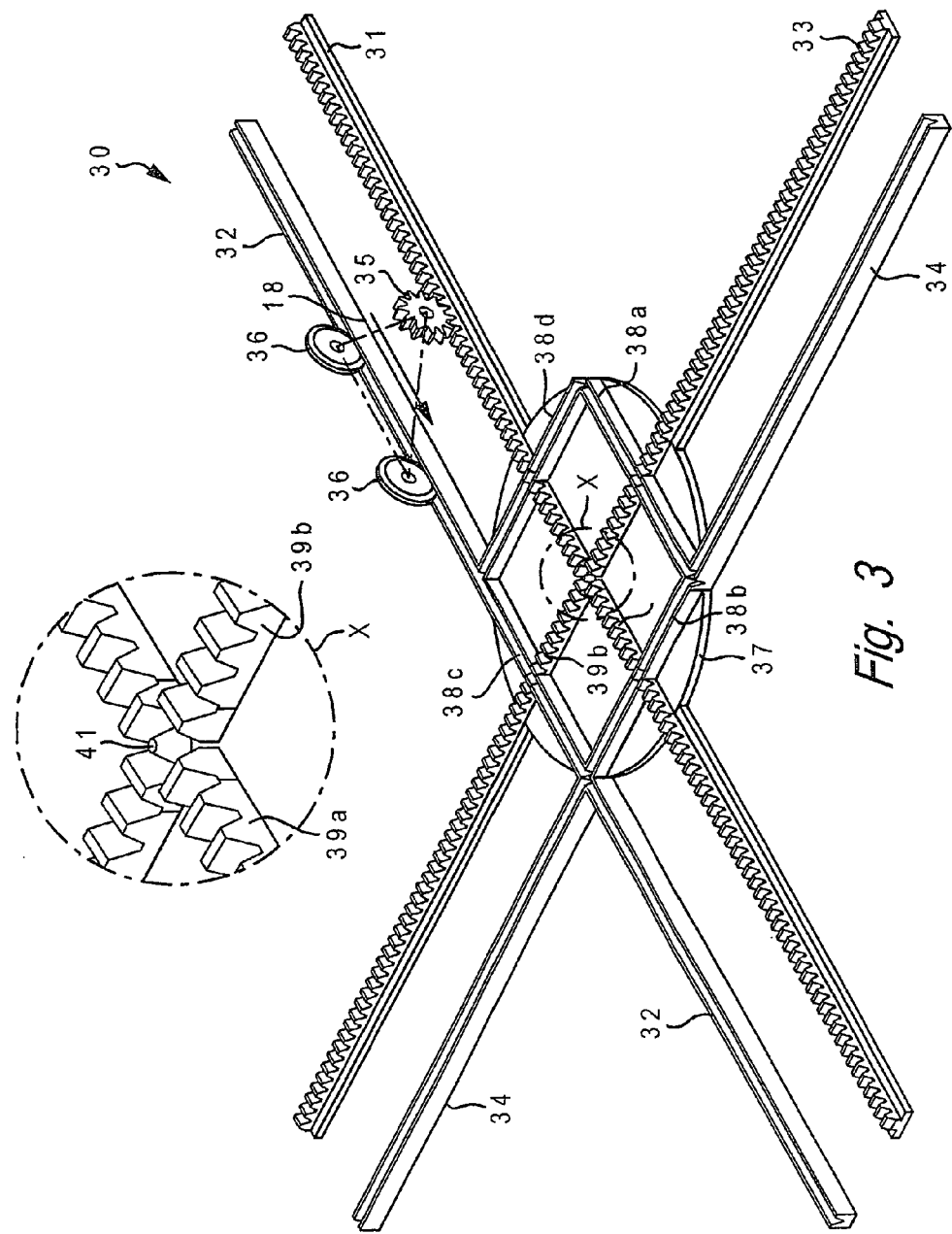
FIG. 3 is a perspective view of a switching rack mechanism within a corner storage frame from FIG. 1 having an accessor approaching a turn plate, in accordance with a preferred embodiment of the present invention.

Referring now to FIG. 3, there is depicted a perspective view of a switching rack mechanism within corner storage frame 15, in accordance with a preferred embodiment of the present invention. As shown, a switching rack mechanism 30 includes a first set of rack 31/guide rail 32 and a second set of rack 33/guide rail 34. Rack 31/guide rail 32 intersects with rack 33/guide rail 34 at a 90 degree angle (or orthogonally) from each other. Rack 31 and guide rail 32 are parallel to each other in the same manner that rack 33 and guide rail 34 are parallel to each other.

An accessor, such as accessor 18 from FIG. 2, can travel along the direction of rack 31/guide rail 32 by having a circular pinion 35 and a pair of guide rollers 36 to move along rack 31 and guide rail 32, respectively. Similarly, the accessor can travel along the direction of rack 33/guide rail 34 by having pinion 35 and guide rollers 36 to move along rack 33 and guide rail 34, respectively. A turn plate 37 is located at the intersection of rack 31/guide rail 32 and rack 33/guide rail 34 for assisting accessor 18 to change its moving direction from along rack 31 and guide rail 32 to along rack 33 and guide rail 34.

Turn plate 37 includes guide rails 38a-38d and racks 39a-39b. Guide rails 38a-38d are equal in length and are arranged in a square formation. Racks 39a-39b are equal in length and are arranged in a cross formation. As shown in insert x, a substantially conical shaped rack tooth 41 is located at the intersection of racks 39a and 39b. Conical shaped rack tooth 41 allows pinion 35 to travel along rack 31 straight through rack 33, and vice versa, without any interruption. The symmetrical square formation of guide rails 38a-38d and the symmetrical cross formation of racks 39a-39b allow guide rails 38a-38d and racks 39a-39b to align with rack 31/guide rail 32 and rack 33/guide rail 34 at any given time after turn plate 37 has completed its rotation.

Figure 4:
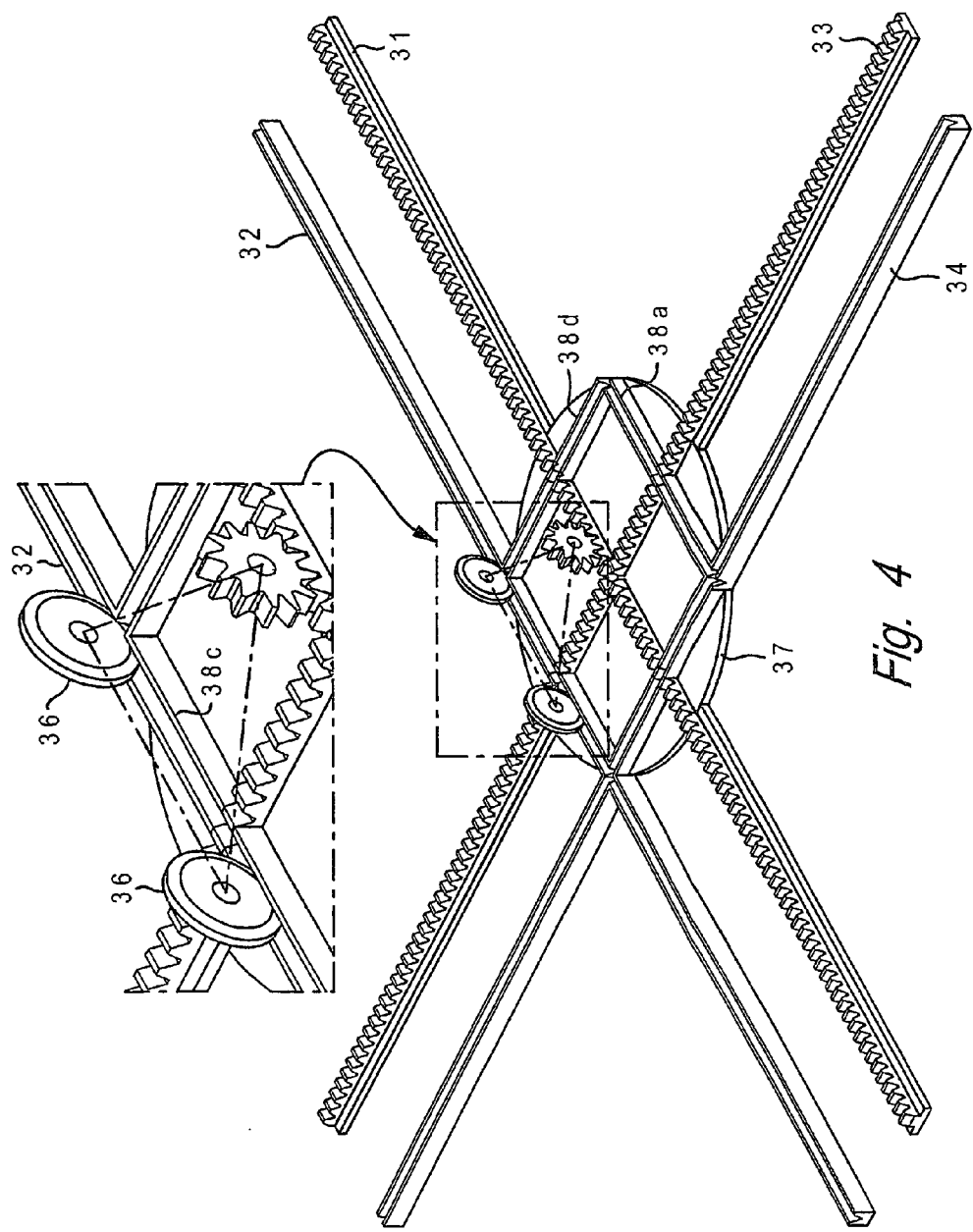
FIG. 4 is a perspective view of a switching rack mechanism having an accessor stopped on a turn plate, in accordance with a preferred embodiment of the present invention.
Figure 5:
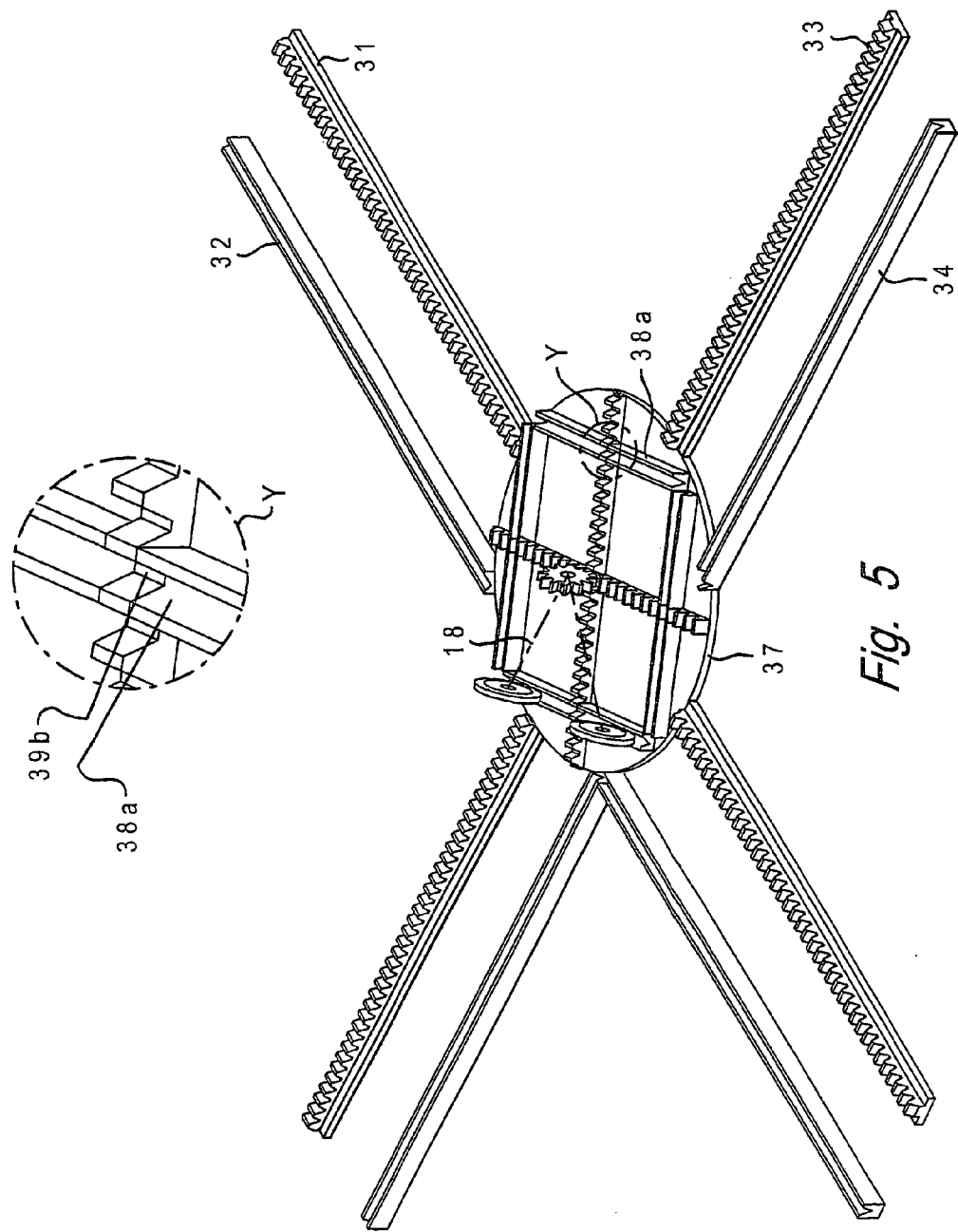
FIG. 5 is a perspective view of a switching rack mechanism having an accessor in the middle of a rotation, in accordance with a preferred embodiment of the present invention.
Figure 6:
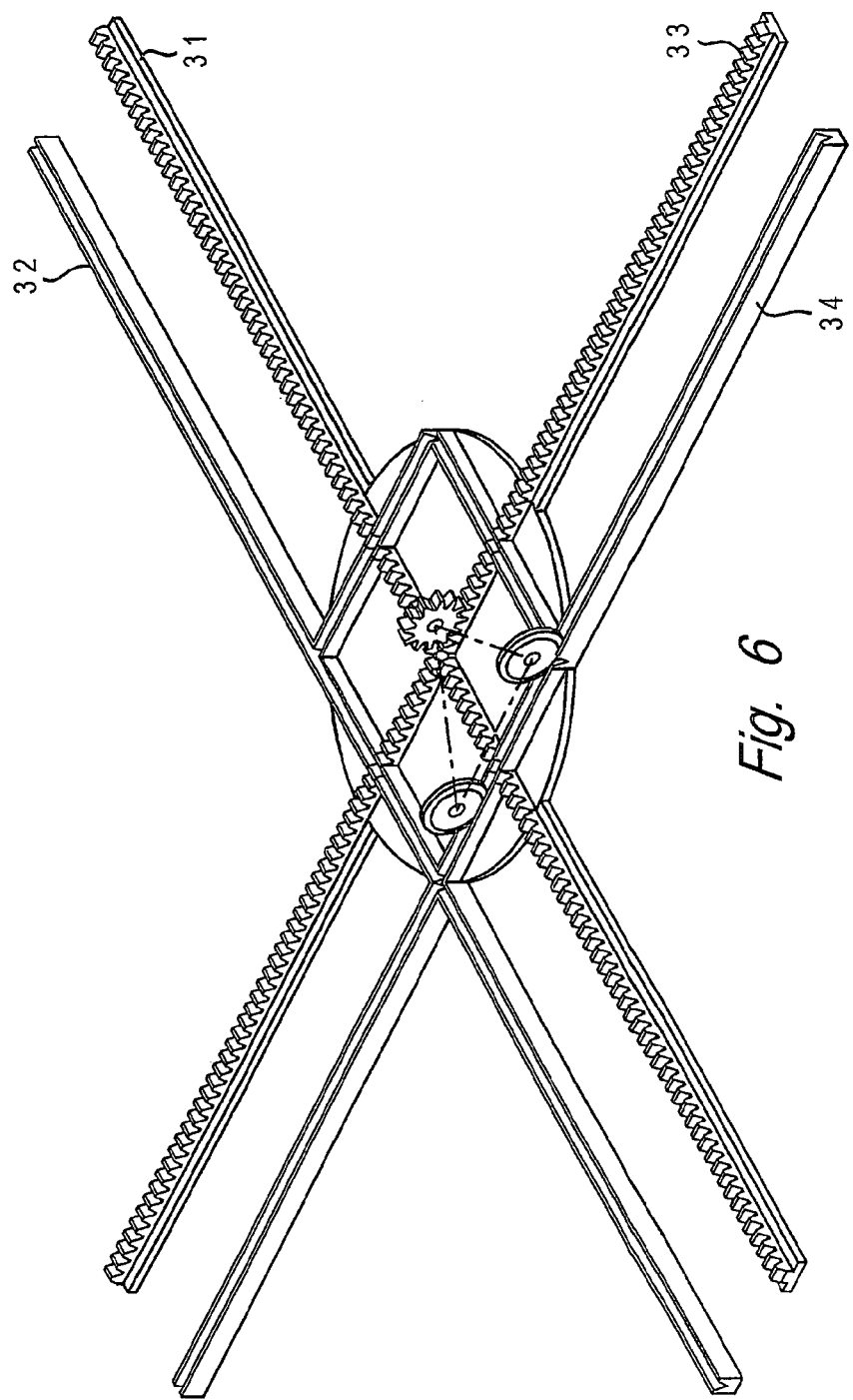
FIG. 6 is a perspective view of a switching rack mechanism having an accessor completed a rotation, in accordance with a preferred embodiment of the present invention.
Figure 7:
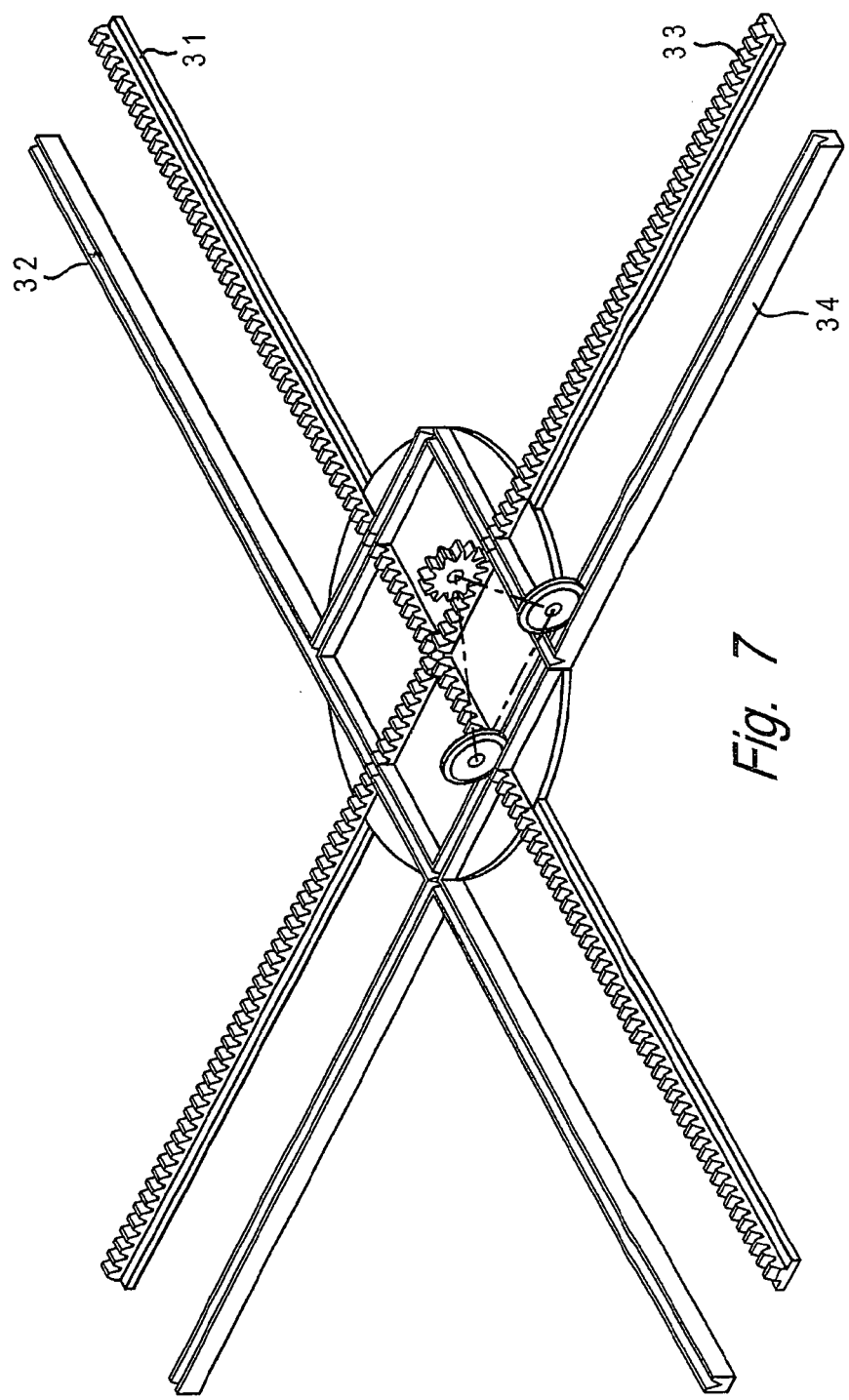
FIG. 7 is a perspective view of a switching rack mechanism having an accessor leaving a turn plate, in accordance with a preferred embodiment of the present invention.

For example, in FIG. 3, accessor 18 is moving along the direction of rack 31 and guide rail 32. In order for accessor 18 to change its moving direction, accessor 18 would stop at turn plate 37, as shown in FIG. 4. At such point, turn plate 37 begins to rotate, as depicted in FIG. 5, to order to align accessor 18 along the direction of rack 33 and guide rail 34, as shown in FIG. 6. After the rotation of turn plate 37 has been completed, accessor 18 can begin moving along the direction of rack 33 and guide rail 34, as depicted in FIG. 7.

In order to provide a smooth and seamless direction switching for accessor 18, the widths of guide rollers 36 are equal to the widths of their mating guide rails 32 and 38c (as depicted in the insert of FIG. 4) and other guide rails 34, 38a, 38b and 38d. In addition, the grooved inner profiles of guide rails 32, 34 and 38a-38d are the same as the profiles of racks 31, 33 and 39a-39b between their teeth. For example, the grooved inner profile of guide rail 38a is the same as the profile of rack 39b between its teeth, as depicted in the insert y of FIG. 5.

Accessor 18 can rotate turn plate 37 having racks 39a-39b and guide rails 38a-38d when required. The spring loaded detents are included to ensure that turn plate 37 is always "square" to rack 31/guide rail 32 and rack 33/guide rail 34 even if the rotating mechanism on accessor 18 fails in the midst of its rotation. The symmetrical arrangement of the racks and guide rails on turn plate 37 along with rack 31/guide rail 32 and rack 33/guide rail 34 ensure that accessor 18 will be able to traverse a rack no matter which detented position accessor 18 is in.

As has been described, the present invention provides a data storage library having a switching rack mechanism for altering the moving direction of an accessor.

While the invention has been particularly shown and described with reference to a preferred embodiment, it will be understood by those skilled in the art that various changes in form and detail may be made therein without departing from the spirit and scope of the invention.

What is claimed is:

1. An apparatus for transporting a storage media cartridge within a data storage library, said apparatus comprising:
    a first rack and guide rail pair, wherein said first rack is in parallel with said first guide rail, and said first rack has a plurality of rack teeth;
    a second rack and guide rail pair, wherein said second rack is in parallel with said second guide rail, and said second rack has a plurality of rack teeth, wherein said second rack and guide rail pair is located orthogonally from said first rack and guide rail pair;
    an accessor capable of moving from said first rack and guide rail pair to said second rack and guide rail pair; and
    a turn plate located at an intersection between said first rack and guide rail pair and said second rack and guide rail pair for changing a moving direction of said accessor, wherein said turn plate includes two racks and four guide rails, wherein said turn plate includes a conical shaped rack tooth located at an intersection of said two racks.

2. The apparatus of claim 1, wherein said apparatus further includes a plurality of guide rollers, wherein widths of said plurality of guide rollers are equal to widths of said guide rails.

3. The apparatus of claim 2, wherein an inner profile of any of said guide rails is identical to a profile of any of said racks between their teeth.

4. The apparatus of claim 1, wherein said four guide rails on said turn plate are arranged in a square formation.

5. The apparatus of claim 1, wherein said two racks on said turn plate are arranged in a cross formation.

6. The apparatus of claim 1, wherein said turn plate is capable of being rotated by said accessor.

7. The apparatus of claim 1, wherein said turn plate is always aligned with said first rack and guide rail pair or said second rack and guide rail pair.

* * * * *